US009997810B2

(12) United States Patent
Tajima et al.

(10) Patent No.: US 9,997,810 B2
(45) Date of Patent: Jun. 12, 2018

(54) ELECTRICALLY DRIVEN VEHICLE

(71) Applicant: HONDA MOTOR CO., LTD., Tokyo (JP)

(72) Inventors: Takamitsu Tajima, Wako (JP); Tomohisa Aruga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/128,908

(22) PCT Filed: Feb. 19, 2015

(86) PCT No.: PCT/JP2015/054574
§ 371 (c)(1),
(2) Date: Sep. 23, 2016

(87) PCT Pub. No.: WO2015/146387
PCT Pub. Date: Oct. 1, 2015

(65) Prior Publication Data
US 2017/0110771 A1   Apr. 20, 2017

(30) Foreign Application Priority Data

Mar. 26, 2014   (JP) ................................. 2014-062846

(51) Int. Cl.
*H01M 10/00*   (2006.01)
*H01M 10/625*   (2014.01)
(Continued)

(52) U.S. Cl.
CPC ........... *H01M 10/625* (2015.04); *B60K 11/04* (2013.01); *B60L 11/182* (2013.01);
(Continued)

(58) Field of Classification Search
CPC ............ H01M 10/625; H01M 10/613; H01M 10/6567; H01M 10/6551; H01M 2220/20;
(Continued)

(56) References Cited

U.S. PATENT DOCUMENTS 6,332,497 B1 * 12/2001  Niwa ................. B60H 1/00007
165/204
2010/0062328 A1    3/2010  Takagi

FOREIGN PATENT DOCUMENTS

JP   2013-62023 A   4/2013
WO  2008/050736 A1  5/2008

OTHER PUBLICATIONS

International Search Report dated Apr. 7, 2015, issued in counterpart International Application No. PCT/JP2015/054574 (1 page).

\* cited by examiner

*Primary Examiner* — Mark F. Huff
*Assistant Examiner* — Monique M Wills
(74) *Attorney, Agent, or Firm* — Westerman, Hattori, Daniels & Adrian, LLP

(57) ABSTRACT

This electrically driven vehicle is configured so that a first liquid cooling medium having a relatively high specific gravity and a second liquid cooling medium having a relatively low specific gravity exchange heat in a heat exchanger disposed closer to the rear of the vehicle than a radiator disposed at the front of the vehicle. As a result, the second liquid cooling medium having a relatively low specific gravity flows between the radiator and the heat exchanger, and consequently, an increase in the weight of a cooling mechanism for a battery can be minimized.

6 Claims, 17 Drawing Sheets

(51) Int. Cl.
*H01M 10/613* (2014.01)
*H01M 10/6567* (2014.01)
*H01M 10/6551* (2014.01)
*B60L 11/18* (2006.01)
*B60K 11/04* (2006.01)

(52) U.S. Cl.
CPC ....... *B60L 11/1874* (2013.01); *B60L 11/1877* (2013.01); *H01M 10/613* (2015.04); *H01M 10/6551* (2015.04); *H01M 10/6567* (2015.04); *B60Y 2200/91* (2013.01); *B60Y 2400/112* (2013.01); *H01M 2220/20* (2013.01)

(58) Field of Classification Search
CPC .......................... B60L 11/182; B60L 11/1877; B60L 11/1874; B60K 11/04
See application file for complete search history.

ELECTRICALLY DRIVEN VEHICLE

TECHNICAL FIELD

The present invention relates to an electric vehicle (electrically driven vehicle) equipped with a motor for driving the electric vehicle, and more specifically, relates to an electric vehicle in which the weight of a heat dissipating mechanism for dissipating heat of a battery that supplies electrical power to the motor is minimized.

BACKGROUND ART

In an electric vehicle such as an electric automobile, a hybrid vehicle equipped with an internal combustion engine, and a fuel cell vehicle equipped with a fuel cell or the like, a battery is mounted therein that supplies electrical power to a motor for driving the vehicle, and the battery generates heat by chemical reactions that take place during charging and discharging of the battery.

Suppression or heat generation and temperature rise of the battery is important in order to maintain the operating characteristics of the battery, and to avoid a decrease in the life of the battery.

In FIG. 5 of Japanese Laid-open Patent Publication No. 2013-062023, a battery case cooling mechanism is disclosed. A battery case in which plural series-connected battery cells are accommodated is arranged underneath a vehicle compartment of a vehicle, while a cooling device is arranged in the front of the vehicle, and refrigerant pipes are connected between the battery case and the cooling device.

With the battery case cooling mechanism disclosed in Japanese Laid-Open Patent Publication No. 2013-062023, in a battery case main body, 70% to 80% of the internal volume, which is defined by subtracting a volume occupied by the battery cells from the entire internal volume, is filled with an insulating refrigerant liquid (hereinafter referred to simply as a liquid refrigerant), which is a hydrofluoroether (density≈1500 [kg/m$^3$]), and a remaining 30% to 20% thereof is not filled with the liquid refrigerant to thereby form a refrigerant liquid non-filling space (see paragraph [0015] of Japanese Laid-Open Patent Publication No. 2013-062023).

The liquid refrigerant is vaporized at the time that the battery cells are cooled, and by passing through the refrigerant pipes from the battery case, and being cooled by the cooling device, the refrigerant is liquefied and returned again to the battery case (see paragraph [0025] of Japanese Laid-Open Patent Publication No. 2013-062023).

In FIGS. 1 through 3 of International Publication No. WO 2008/050736, a single laminate type of battery cell in which lithium is used (referred to as a power storage apparatus 5 in International Publication No. WO 2008/050736) is disclosed.

In International Publication No. WO 2008/050736, it is disclosed that the outer surface of a case made of laminated film (it is noted that the case may also be made of a metal material) can be coded by using a cooling medium (see paragraphs [0038], [0049] of International Publication No, WO 2008/050736).

In addition, in International Publication No. WO 2008/050736, it further is disclosed that a cooling mechanism is constituted by housing the battery cells in a sealed container, and filling a coaling liquid in the sealed container, whereby the cooling liquid can be naturally convicted in the sealed container, and a circulating path is connected to the sealed container, and the cooling liquid (a liquid which exchanges heat with the battery cells) can be cooled by a radiator disposed on the circulating path (see paragraph [0050] of International Publication No. WO 2008/050736).

SUMMARY OF INVENTION

Incidentally, with an electric vehicle, a large travel distance per unit consumption rate of an energy source such as fuel or the like is desirable from the standpoints of resource-saving and a reduction in running costs.

However, with the electric vehicle equipped with the battery case cooling mechanism disclosed in Japanese Laid-Open Patent Publication No. 2013-062023, since the insulating liquid refrigerant having a large specific gravity is accommodated in the battery case beneath the vehicle compartment, the cooling device in the front portion of the vehicle, and the refrigerant pipes, the electric vehicle becomes increased in weight, with the result that electrical energy efficiency at the time of traveling of the electric vehicle is decreased.

Similarly, as disclosed in International Publication No. WO 2008/050736, in the case that a cooling mechanism is adopted in which a circulating path is connected to a sealed container in which the battery cells are accommodated, and the cooling liquid is cooled by a radiator, when a fluorine-based inert liquid, such as Fluorinert (registered trademark) (density≈1800 [kg/m$^3$]) or the like, is used as the cooling liquid, a problem of an increased weight of the electric vehicle is not resolved.

Recently, in order to improve feel efficiency and electrical energy efficiency, when it is attempted to reduce the weight of the vehicle at a time that the vehicle is developed or the like, the weights of constituent elements of the vehicle are managed on the basis of gram [g] units.

The present invention, has been devised taking into consideration the aforementioned problems, and has the object of providing an electric vehicle equipped with a battery cooling mechanism, which is capable of improving cooling efficiency, together with reducing an amount at which an insulating liquid refrigerant having a large specific gravity is used.

An electric vehicle according to the present invention is equipped with an electric motor configured to drive the vehicle, the electric vehicle including a battery configured to supply electrical power to the electric motor, and having a battery cell, the battery cell being cooled by direct contact with an insulating first liquid refrigerant, and a battery case configured to house therein the battery cell and through which the first liquid refrigerant flows, a radiator configured to dissipate heat from a second liquid refrigerant, the radiator being disposed forwardly of the battery in the electric vehicle, and a heat exchanger that is disposed rearwardly of the radiator in the electric vehicle, wherein the second liquid refrigerant has a smaller specific gravity than the first liquid refrigerant, and the first liquid refrigerant and the second liquid refrigerant undergo heat exchange in the heat exchanger that is disposed rearwardly of the radiator in the electric vehicle.

According to the present invention, the first liquid refrigerant having a relatively large specific gravity and the second liquid refrigerant having a relatively small specific gravity undergo heat exchange in the heat exchanger, which is disposed rearwardly of the radiator that is disposed on the front side of the vehicle, whereby the second liquid refrigerant having a relatively small specific gravity flows from the radiator to the heat exchanger. Therefore, compared to a case in which a first liquid refrigerant is made to flow from the battery case to the radiator and dissipation of heat occurs in the radiator, as in Japanese Laid-Open Patent Publication No. 2013-062023 and International Publication No. WO 2008/050736, even if there is an increase in the weight of the heat exchanger, the increased weight amount of the heat exchanger is exceeded by the reduced weight amount, which is made up by adding to the weight reduction amount of the liquid refrigerant that flows in the radiator the weight reduction amount of the liquid refrigerant that flows through the pathway from the heat exchanger to the radiator, and thus, an increase in the weight of the battery cooling mechanism can be suppressed.

Consequently, while the battery cell is cooled effectively by the first liquid refrigerant that flows through the interior of the battery case, by suppressing an increase in the weight of the first liquid refrigerant, a reduction in the efficiency (electrical energy efficiency, fuel efficiency) of the electric vehicle can be suppressed.

If a path length of a first liquid refrigerant circulation path along which the first liquid refrigerant is circulated front the battery case to the heat exchanger is shorter than a path length of a second liquid refrigerant circulation path along which the second liquid refrigerant is circulated from the heat exchanger to the radiator, since the path length along which the first liquid refrigerant having a large specific gravity circulates can be shortened, an increase in the weight of the liquid refrigerant can be suppressed more effectively.

The heat exchanger is disposed rearwardly of the radiator in the electric vehicle, and is arranged it front of the battery or in proximity to the battery, whereby the degree of freedom in the arrangement layout of the radiator and the battery can be increased.

By disposing the battery downwardly of the vehicle compartment, and disposing the heat exchanger downwardly of the vehicle compartment, and in front of the battery, the battery, which is made up from the battery case in which the battery cell is accommodated, can be arranged using the space below the vehicle compartment, and together therewith, the heat exchanger can also be disposed in a position where it is unlikely to have an influence on the vehicle compartment space. Consequently, while the vehicle compartment space is ensured, by suppressing an increase in the weight of the liquid refrigerant, a reduction in the efficiency (electrical energy efficiency, fuel efficiency) or the electric vehicle can be suppressed.

By disposing the battery and the heat exchanger rearwardly of the vehicle compartment, the battery, which is made up from the battery case in which the battery cell is accommodated, can be arranged using the space behind the vehicle compartment, and together therewith, the heat exchanger can also be disposed behind the vehicle compartment. Consequently, while the height inside the vehicle compartment is increased, it is possible to circulate the second liquid refrigerant having a relatively small specific gravity along a relatively long pathway from the rearward side of the vehicle compartment to the radiator on the front side of the vehicle. In this case as well, while the vehicle compartment space is ensured, an increase in the weight of the liquid refrigerant can effectively be suppressed.

According to the present invention, the first liquid refrigerant having a relatively large specific gravity and the second liquid refrigerant having a relatively small specific gravity undergo heat exchange in the heat exchanger, which is disposed rearwardly of the radiator that is disposed on the front side of the vehicle, whereby the second liquid refrigerant having a relatively small specific gravity flows from the radiator to the heat exchanger. Therefore, compared to a case in which a first liquid refrigerant is made to flow from the battery case to the radiator and dissipation of heat occurs in the radiator, as in Japanese Laid-Open Patent Publication No. 2013-062023 and International Publication No. WO 2008/050736, even if there is an increase in the weight of the heat exchanger, the increased weight amount of the heat exchanger is exceeded by the reduced weight amount, which is made up by adding to the weight reduction amount of the liquid refrigerant that flows in the radiator the weight reduction amount of the liquid refrigerant that flows through the pathway from the heat exchanger to the radiator, and thus, an increase in the weight of the battery cooling mechanism can be suppressed.

Consequently, while the battery cell is cooled effectively by the first liquid refrigerant that flows through the interior of the battery case, by suppressing an increase in the weight of the first liquid refrigerant having a relatively large specific gravity, a reduction in the efficiency (electrical energy efficiency, fuel efficiency) of the electric vehicle can be suppressed, together with enabling an improvement in cooling efficiency.

DESCRIPTION OF EMBODIMENTS

A preferred embodiment of an electric vehicle according the present invention will be described in detail below with reference to the accompanying drawings.

Figure 1:
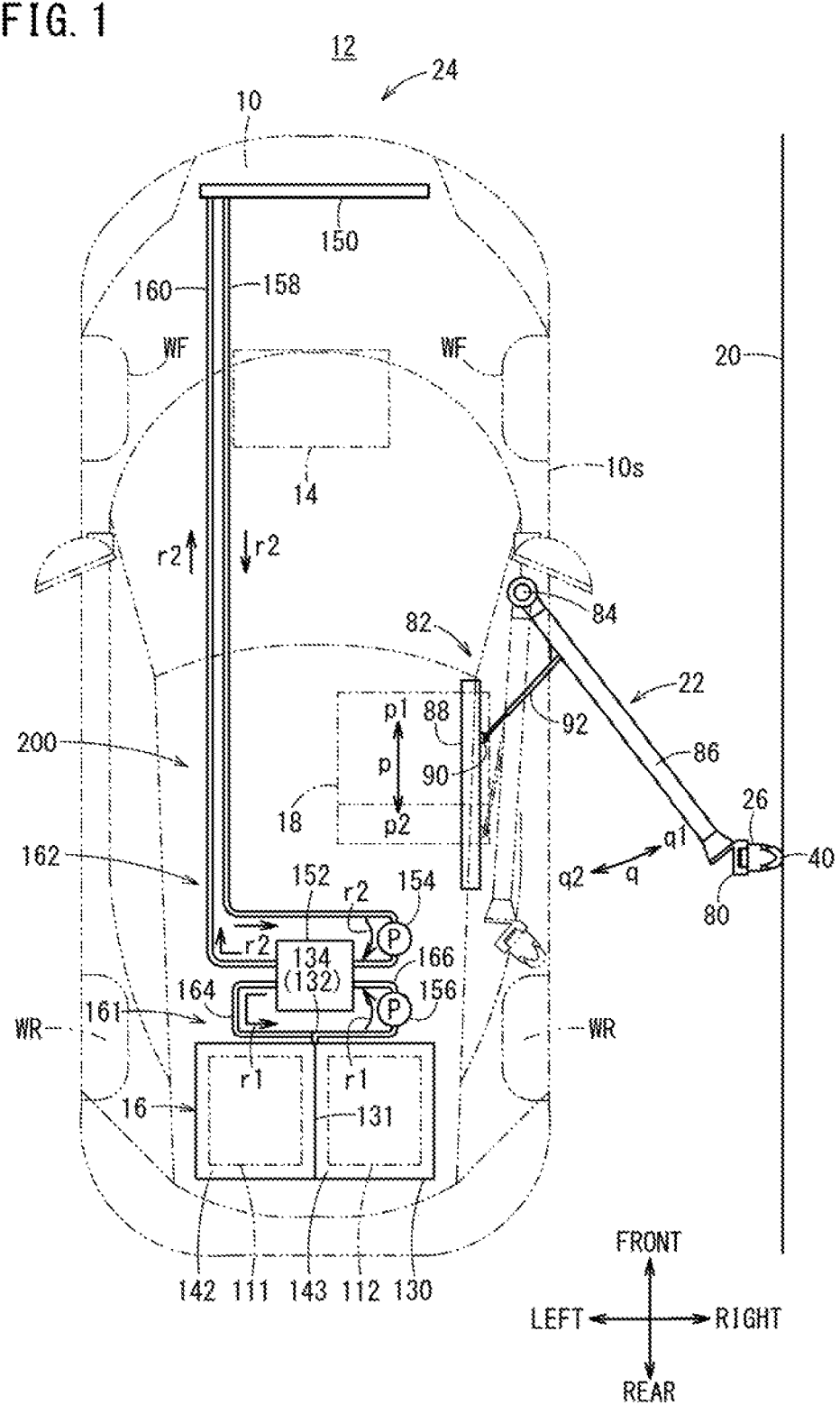
FIG. 1 is a schematic structural view of an electric vehicle according to an embodiment of the present invention which is applied to a contact charging system, as seen from an upper surface of the electric vehicle.
Figure 2:
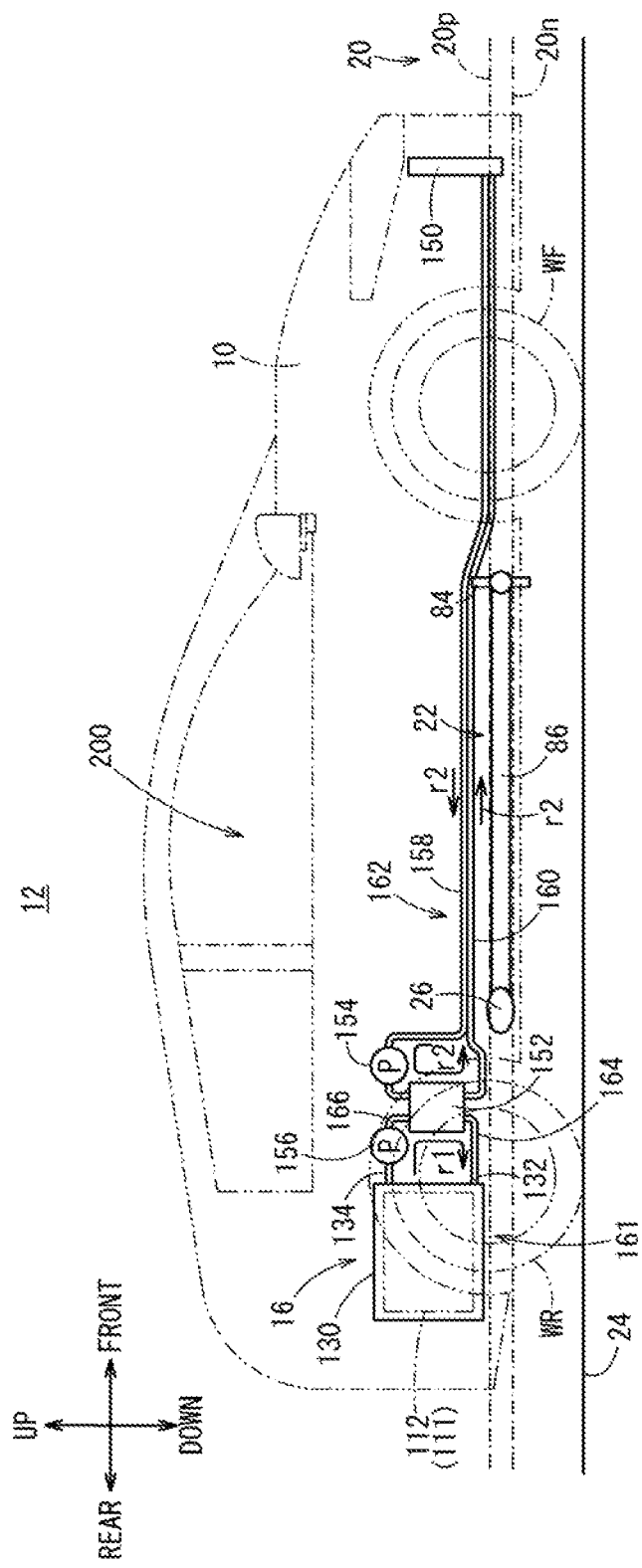
FIG. 2 is a schematic structural view as seen from a right side surface of the electric vehicle of FIG. 1.
Figure 3:
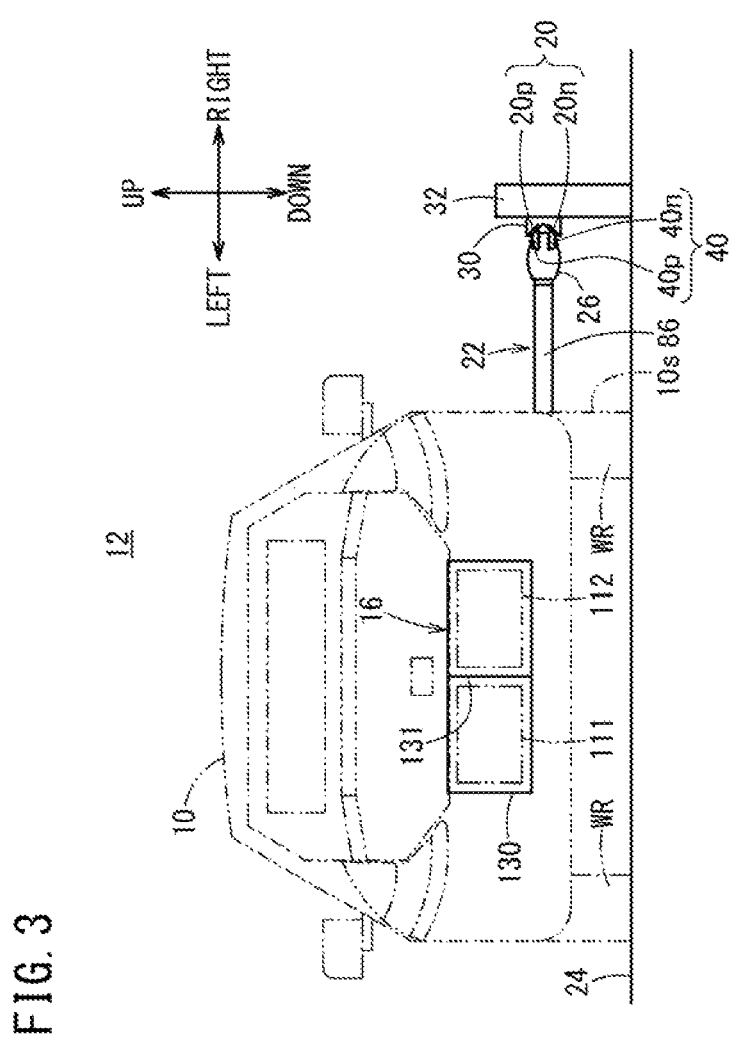
FIG. 3 is a schematic structural view as seen from a rear surface of the electric vehicle of FIG. 1.

FIG. 1 shows a schematic configuration of an electric vehicle 10 according to an embodiment of the present invention which is applied to a contact charging system 12, as seen from an upper surface of the electric vehicle 10, and FIG. 2 shows a schematic configuration as viewed from a right side surface of the electric vehicle 10, and FIG. 3 shows a schematic configuration as viewed from a rear surface of the electric vehicle 10.

The electric vehicle 10 is a vehicle in which there is incorporated an electric motor 14 for driving the vehicle, and a battery 16 for supplying electrical power to the electric motor 14. The electric vehicle 10, for example, corresponds to an electric automobile, a hybrid vehicle in which an internal combustion engine is incorporated, a fuel cell vehicle in which a fuel cell is incorporated, or the like. The front and rear, left and right, and upper and lower directions will be described in accordance with the directions of the arrows shown in FIGS. 1 through 3.

The contact charging system 12 is constituted from power lines 20 made of a conductive material, to which electrical power is supplied from the exterior and which are supported at suitable locations by guide posts 32 (see FIG. 3), and the electric vehicle 10, which is equipped with a charging arm 22 capable of being placed in contact with the power lines 20. The charging arm 22 is provided on a bottom surface side of a side portion 10s on the side of a driver's seat 18 of the electric vehicle 10, and is disposed and accommodated between the front wheels WF and the rear wheels WR. The power lines 20 are arranged along a driver's seat 18 side of a travel path (road) 24 on which the electric vehicle 10 travels, and are arranged so as to face to the side portion 10s on the driver's seat 18 side of the electric vehicle 10.

The power lines 20 may be disposed at the length of a specified interval. The length of the specified interval, for example, may be set to a length that, for example, is capable of charging the battery 16 with an amount of electrical power such that the electric vehicle 10 is capable of traveling from a position where a certain one of the power lines 20 is disposed to a position where a next one of the power lines 20 is disposed. While traveling along the power lines 20 on the travel path 24 on which the power lines 20 are arranged, the electric vehicle 10 extends a charging heed 26 including power receiving elements 40 provided on the distal end of the charging arm 22 outwardly in the vehicle transverse direction (vehicle transverse outside direction), and the battery 16 that is mounted in the electric vehicle 10 is charged by the charging head 26 coming into contact with the power lines 20. Stated otherwise, while the electric vehicle 10 travels in contact with the power lines 20, the contact charging system 12 charges the battery 16 with electrical power supplied from the power lines 20.

Figure 4:
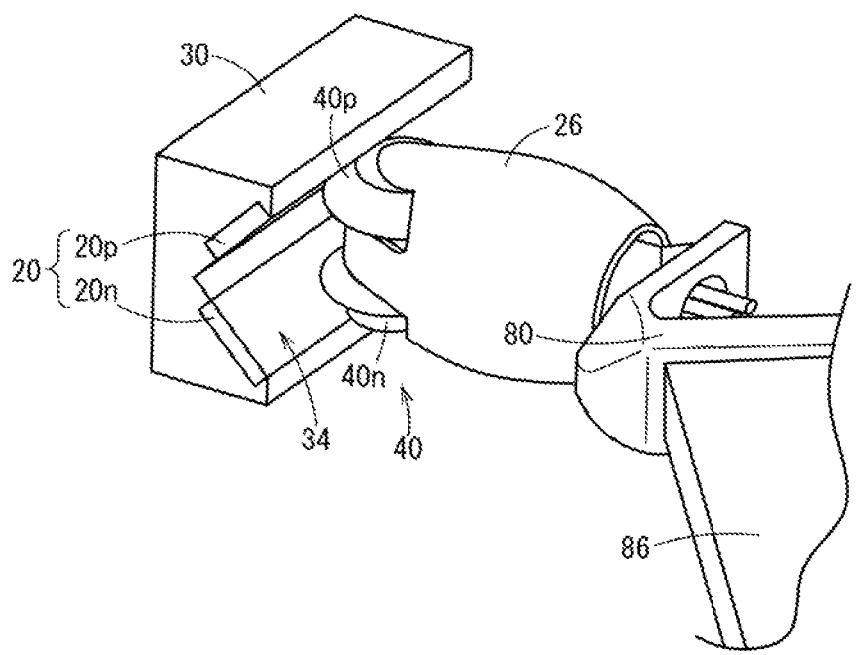
FIG. 4 is a perspective view with partial omission showing a contact site of a charging head with power lines.

As shown in FIG. 4, charging (contact, charging, contact supply of power) is carried, out by the charging head 26 being placed in contact with the power lines 20 while the electric vehicle 10 is traveling.

The power lines 20 are constituted from a positive electrode side power line 20p made of a conductive material, which is retained by a power line retaining unit 30, and on which a first voltage, which is a high DC voltage, is imposed from the exterior, and a negative electrode side power line 20n made of a conductive material, which is arranged downwardly of the positive electrode side power line 20p, and on which a second voltage, which is a low DC voltage (reference voltage) lower than the first voltage, is imposed. A front side of the power line retaining unit 30 is shaped in the form of a V-shaped groove 34 so as to open in the vertical direction. The positive electrode side power line 20p is embedded in the upper surface of the V-shaped groove 34 such that a front surface thereof is exposed to outside, and the negative electrode side power line 20n is embedded in the lower surface of the V-shaped groove 34 such that a front surface thereof is exposed to outside. The voltage imposed from the exterior on the power lines 20 (20p, 20n) may also be an AC voltage.

The charging head 26 comprises a pair of upper and lower power receiving elements, i.e., a power receiving element on the positive side (positive electrode side power receiving element) 40p in the form of a roller that contacts the positive electrode side power line 20p of the power lines 20, and a power receiving element on the negative side (negative electrode side power, receiving element) 40n in the form of a roller that contacts the negative electrode side power line 20n of the power lines 20. The power receiving elements 40 are constituted from the positive electrode side power receiving element 40p and the negative electrode side power receiving element 40n. The power receiving elements 40p, 40n are formed from a conductive material. The power receiving elements 40p, 40n are each of the same structure and shape, and have a substantially frustoconical shape.

The power receiving elements 40p, 40n are mounted on the charging head 26 by being separated in a vertically symmetrical manner. It is possible for the charging head 26 to be contacted with the positive electrode side power line 20p and the negative electrode side power line 20n provided in the V-shaped groove 34 through the positive electrode side power receiving element 40p and the negative electrode side power receiving element 40n.

The charging arm 22 includes, in addition to the charging head 26, a bracket 80 to which the charging head 26 is attached, and a slider crank mechanism 82 by which the charging head 26 is moved (rotated) through the bracket 80 in the directions of the arrow q (q1, q2), as shown in FIG. 1.

The slider crank mechanism 82 includes an arm position 86 than constitutes the chaining arm 22, which is expanded horizontally outward in a vehicle transverse direction (vehicle transverse outside direction) by rotating about a shaft (rotary shaft) 84 provided on the side portion 10s side of the electric vehicle 10, a side rail 88, which is mounted along the longitudinal direction of the vehicle body on an inner side with respect to the arm portion 86 in the vehicle body of the electric vehicle 10, an actuator 90 that slides on the slide rail 88 in the directions of the arrow p (p1, p2), and a spring damper 92, one end of which is attached rotatably to the arm portion 86, and another end of which is attached rotatably to the actuator 90. The charging head 26 is attached to the distal end side (a side opposite to the rotary shaft 84) of the arm portion 86 through the bracket 80. The spring damper 92 biases the arm portion 86 in a direction to expand the arm portion 86 outwardly in the vehicle transverse direction by an elastic force.

When the actuator 90 moves on the slide rail 88 in the forward direction of the vehicle, the arm portion 86 is rotated about the rotary shaft 84 in the direction of the arrow q1, and the charging head 26 also is moved together therewith in the direction of the arrow q1. As a result, the arm portion 86 opens horizontally about the rotary shaft 84 from a lateral side of the vehicle body of the electric vehicle 10, and the charging head 26 moves toward the power lines 20.

On the other hand, when the actuator 90 moves on the slide rail 88 in the rearward direction of the vehicle, the arm portion 86 is rotated about the rotary shaft 84 in the direction of the arrow q2, and the charging bead 26 is also moved together therewith in the direction of the arrow q2. As a result, the arm portion 86 is brought into a closed state, and the charging head 26 is housed on the side of the side portion 10s of the electric vehicle 10.

Figure 5:
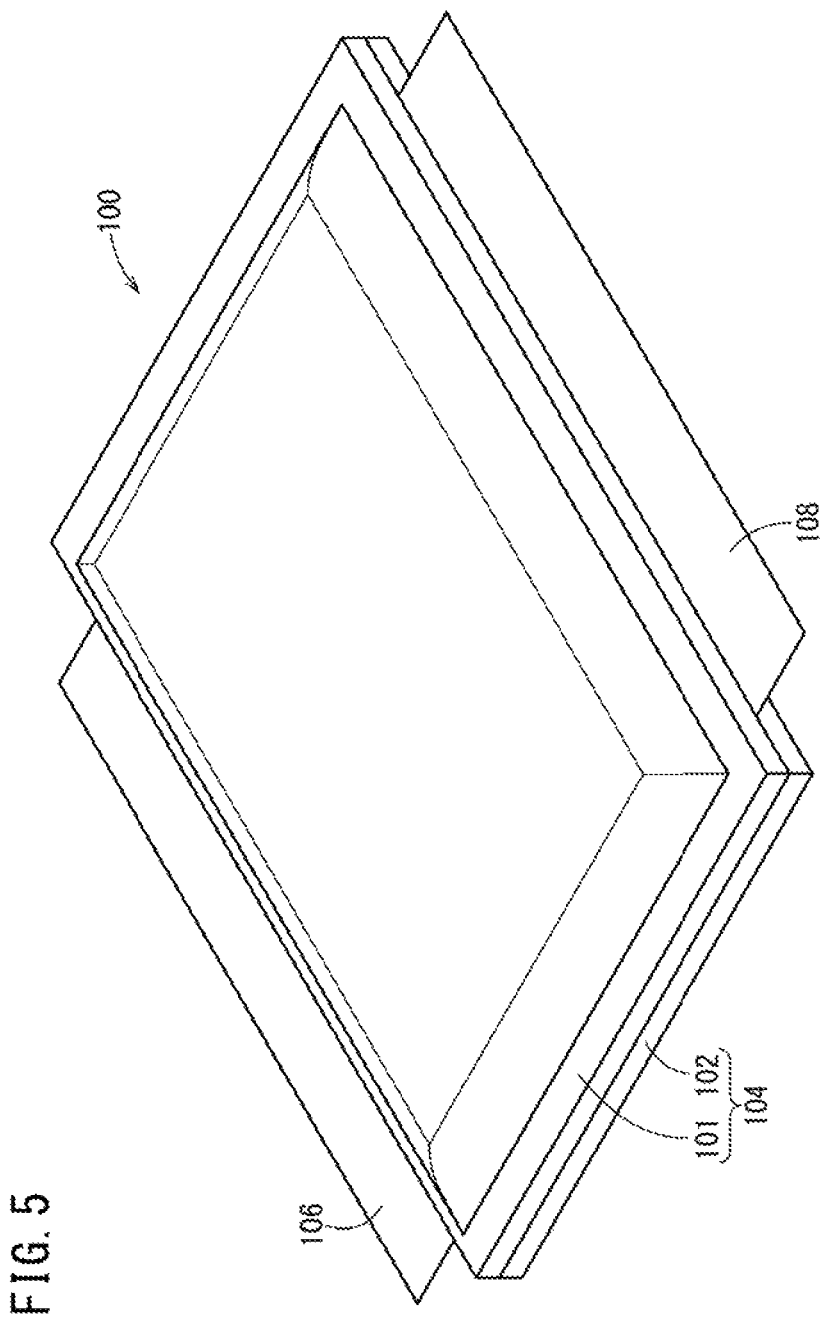
FIG. 5 is a perspective view of a battery cell.

FIG. 5 is a view showing the external structure of a laminate type battery cell 100 (hereinafter referred to as a laminate cell 100) that constitutes part of a battery 16. The battery cell 100 is of a well-known structure in which a battery cell main body is sandwiched between upper and lower sheet bodies 101, 102 (laminate films), the battery cell main body having a stack of a plurality of unit cells each made up from a positive electrode, a separator, and a negative electrode, the unit cells being electrically connected in series. In this state, an electrolyte is injected in the interior of the battery cell 100, and at a region on an outer edge side of the sheet bodies 101, 102, the sheet bodies 101, 102 are thermally fused together mutually and sealed. The sealed sheet bodies 101, 102 are referred to as a laminate case 104. In the battery cell main body in which the unit cells are electrically connected in series, a positive terminal 106 that is connected to the positive electrode on a highest potential side, and a negative terminal 108 that is connected to the negative electrode on a lowest potential side, extend to the exterior from the laminate case 104. Owing thereto, electrical power, which is generated by the battery cell main body in the interior of the laminate case 104, can be extracted to the exterior.

Figure 6:
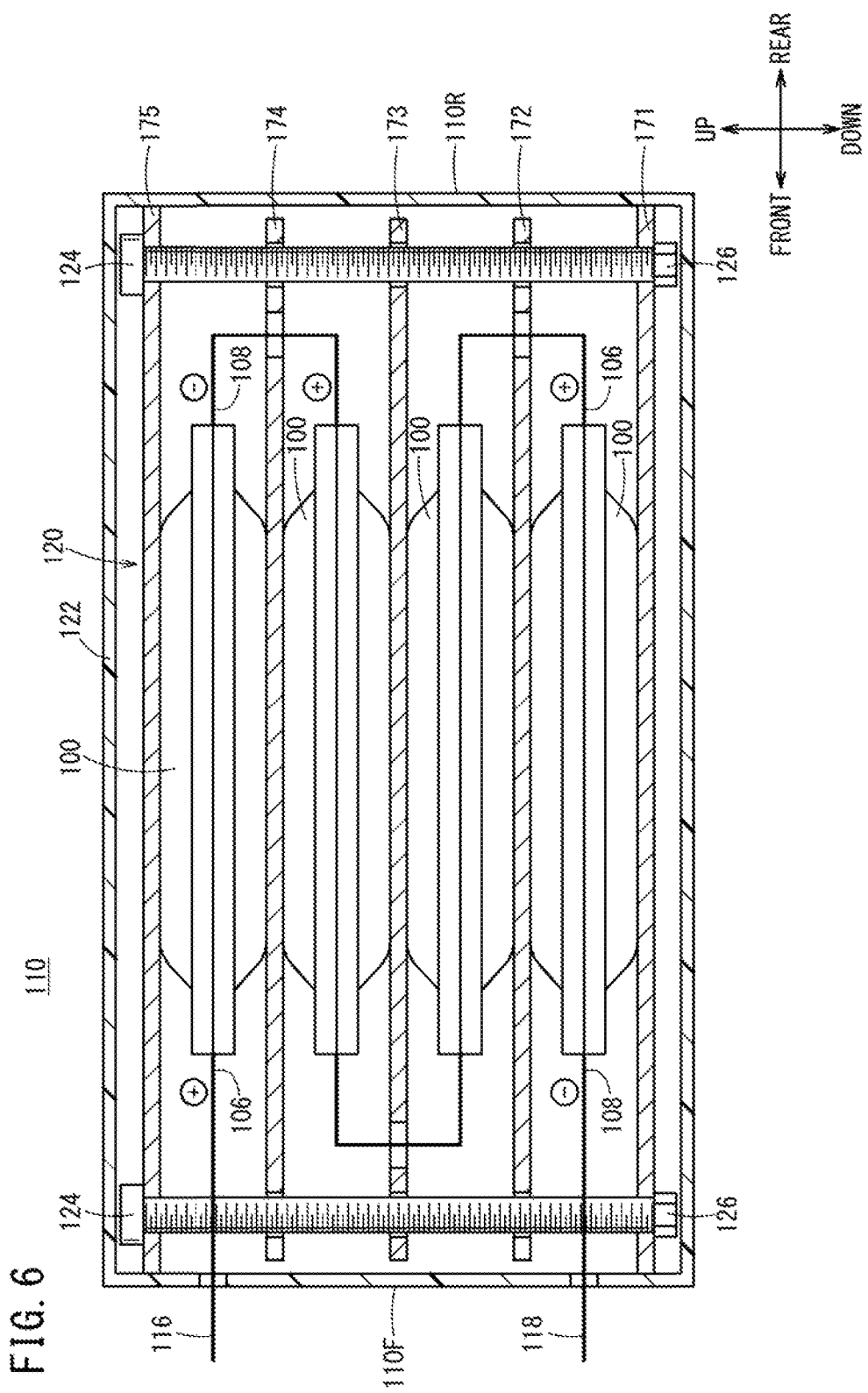
FIG. 6 is a schematic vertical cross-sectional view of a battery cell unit.

FIG. 6 is a schematic vertical cross-sectional view showing a battery cell unit 110 in which the battery cells (laminate cells) 100 are stacked, and the battery cells 100 are connected in series electrically.

The battery cell unit 110 has a structure (also referred to as a battery cell assembly 120) in which the battery cells 100 are sandwiched respectively between respective metal plates consisting of a lower plate 171, intermediate plates 172, 173, 174, and an upper plate 175, and bolts 124 are inserted through the four corners of the upper plate 175 and the lower plate 171 to thereby fix the battery cells 100 by the bolts 124 and nuts 126. The battery sell assembly 120 is accommodated in a rectangular parallelepiped case 122 (referred to as a unit, case 122) to thereby constitute the battery cell unit 110.

On from surface 110F (facing toward the from side of the electric vehicle 10) and a rear surface 110R (facing toward a rear side of the electric vehicle 10) of the battery cell unit 110, there are provided, respectively, a plurality of input ports (input openings), not shown, for inflowing of an insulating liquid refrigerant (also referred to as a first liquid refrigerant), for example, a fluorine-based inert liquid refrigerant such as Fluorinert (registered trademark) or the like, and a plurality of output ports (output openings), not shown, for outflowing (discharging) of the liquid refrigerant. Consequently, a configuration is provided in which the first liquid refrigerant flows into the interior of the battery cell unit 110 from the input ports on the side of the front surface 110F (the front side in FIG. 6), flows through and cools the battery cell assembly 120, and after flowing therethrough, the first liquid refrigerant is discharged (flows out) from the output ports on the side of the rear surface 110R of the battery cell unit 110 (the rear side in FIG. 6).

A positive terminal 110 and a negative terminal 118 extend out to the exterior from the battery cell unit 110.

Figure 7:
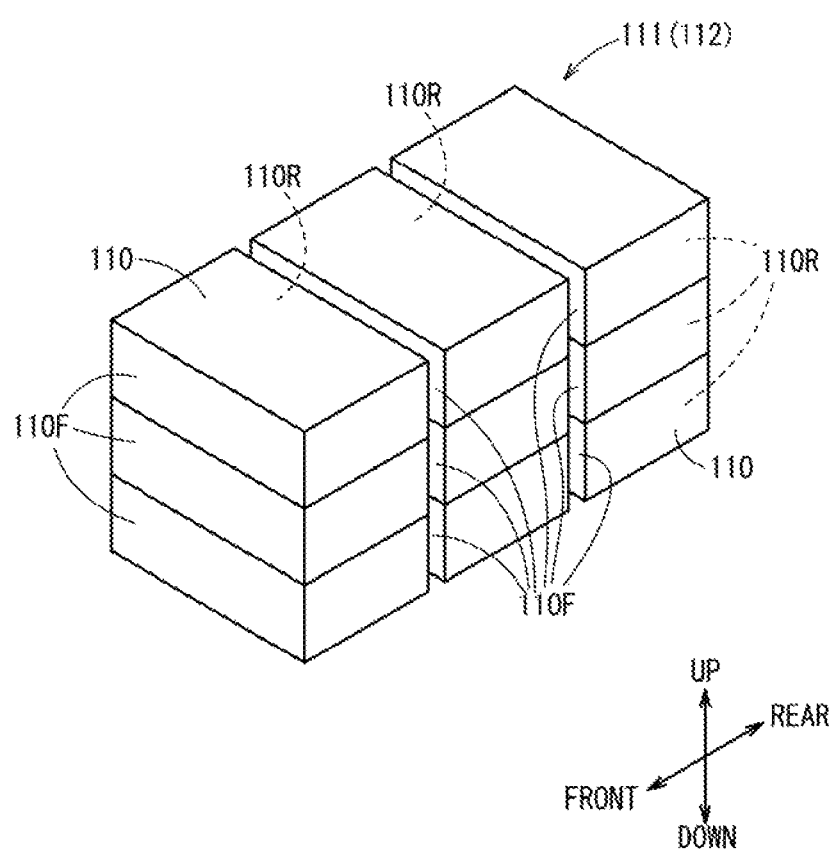
FIG. 7 is a schematic perspective view of a battery cell unit assembly.

FIG. 7 is a schematic perspective view of a battery cell unit assembly 111 (112) in which 3×3=9 individual battery cell units 110 are stacked.

Figure 8:
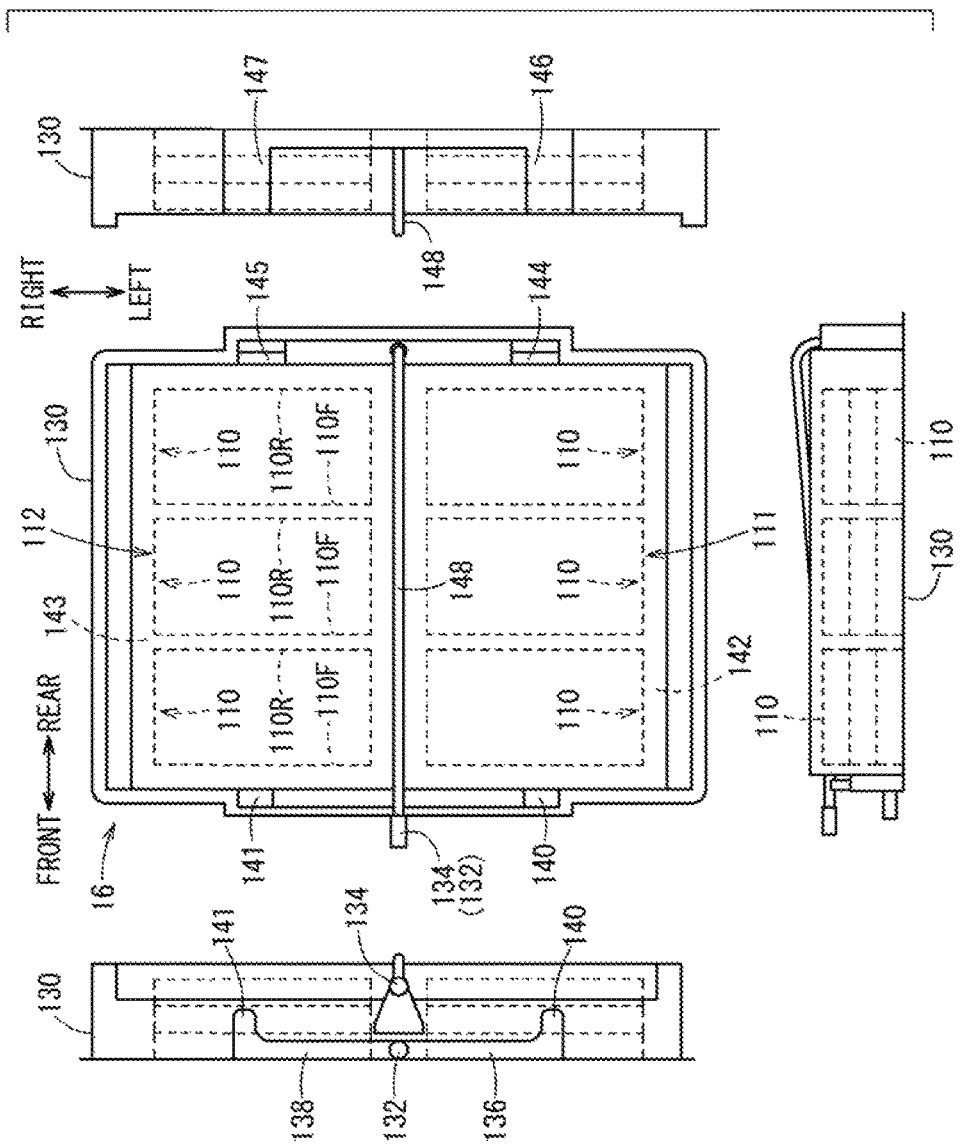
FIG. 8 is a four-face view of a battery made up from the battery cell unit assembly and a battery case in which the battery cell unit assembly is housed.

FIG. 8 is a schematic four-face view of a battery case 130 (also see FIG. 1) in which a total of two of the individual battery cell unit assemblies 111 (112) shown in FIG. 7 are housed, one each, respectively, in chambers 142 and 143 (i.e., eighteen individual battery cell units 110 are accommodated therein).

Figure 9:
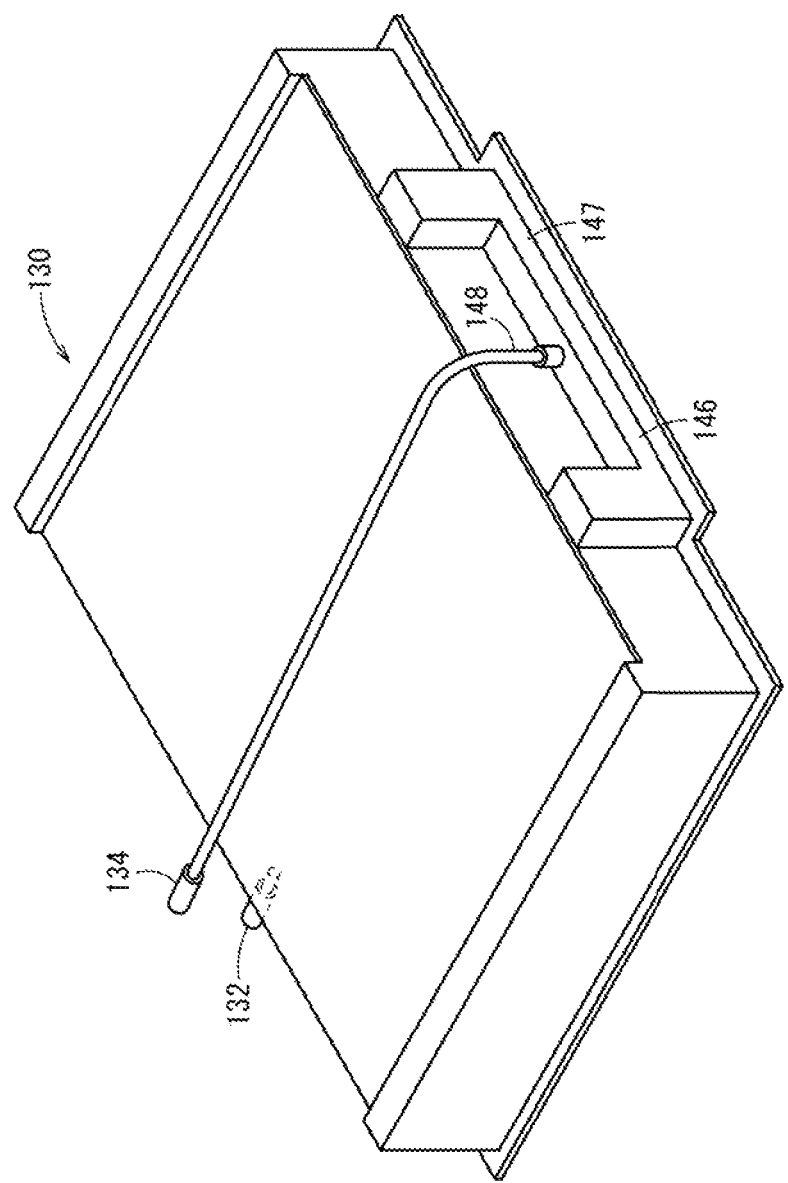
FIG. 9 is a perspective view of the battery.

FIG. 9 is a perspective view of the battery case 130.

The inside of the battery case 130 is divided into two left and right portions by a partition wall 131 (see FIGS. 1 and 3).

In FIG. 8, the center of the figure shows an upper surface view of the battery case 130, the left side of the figure shows a front side surface view of the battery case 130, the right side of the figure shows a rear side surface view of the battery case 130, and the lower side of the figure shows a left side surface view of the battery case 130. As discussed above, in the battery case 130, the partition wall 131 is provided in the center thereof, the battery cell unit assembly 111 (see FIG. 7) made up from nine battery cell units 110 (see FIG. 6) is housed and fixed on the left side thereof, and the battery cell unit assembly 112 made up from nine battery cell units 110 is housed and fixed on the right side thereof.

In the battery case 130, an input port 132 of the first liquid refrigerant is disposed on a relatively lower side thereof, and an output port 134 is disposed on a relatively upper side thereof.

Figure 10:
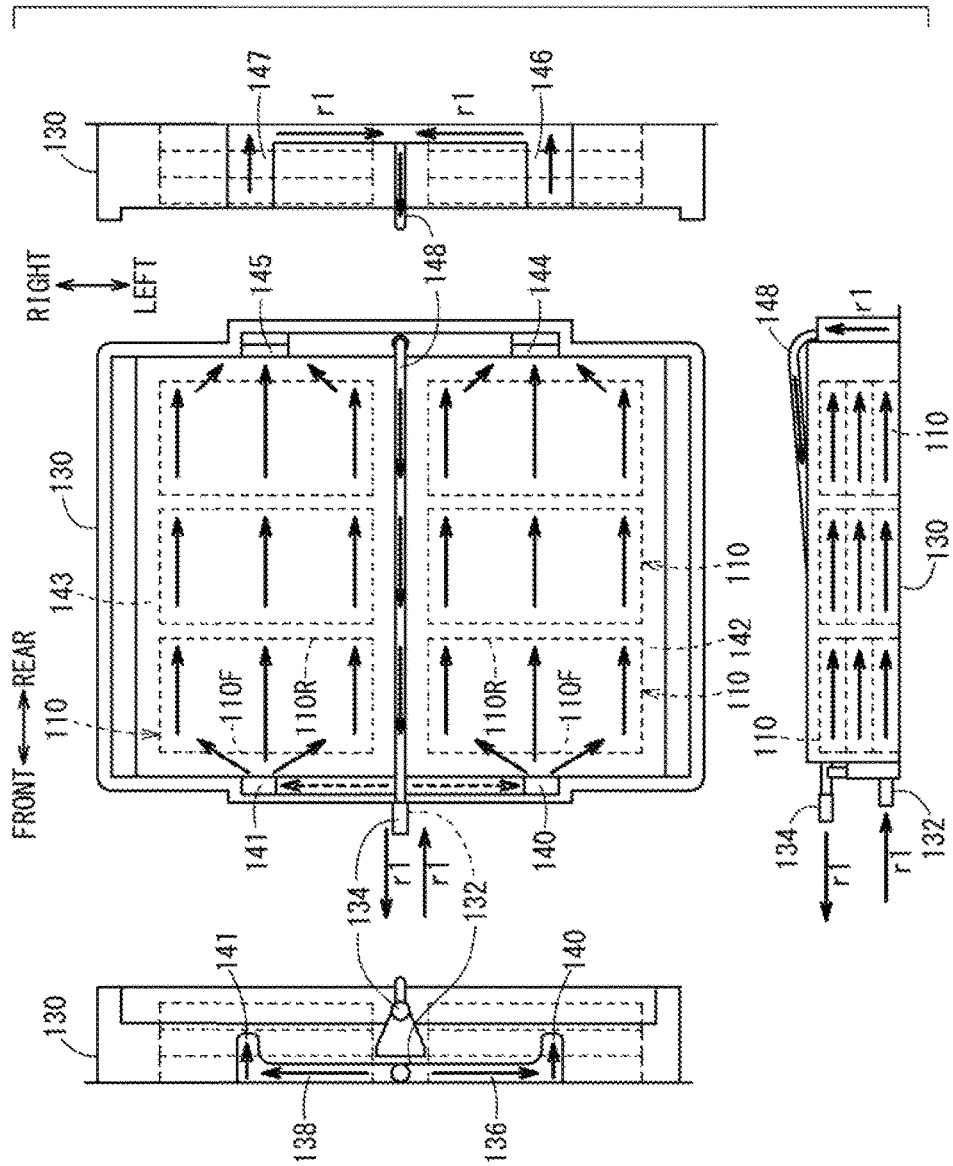
FIG. 10 is a four-face clew of the battery for describing a circulating state of a first liquid refrigerant in the interior of the battery.
Figure 11:
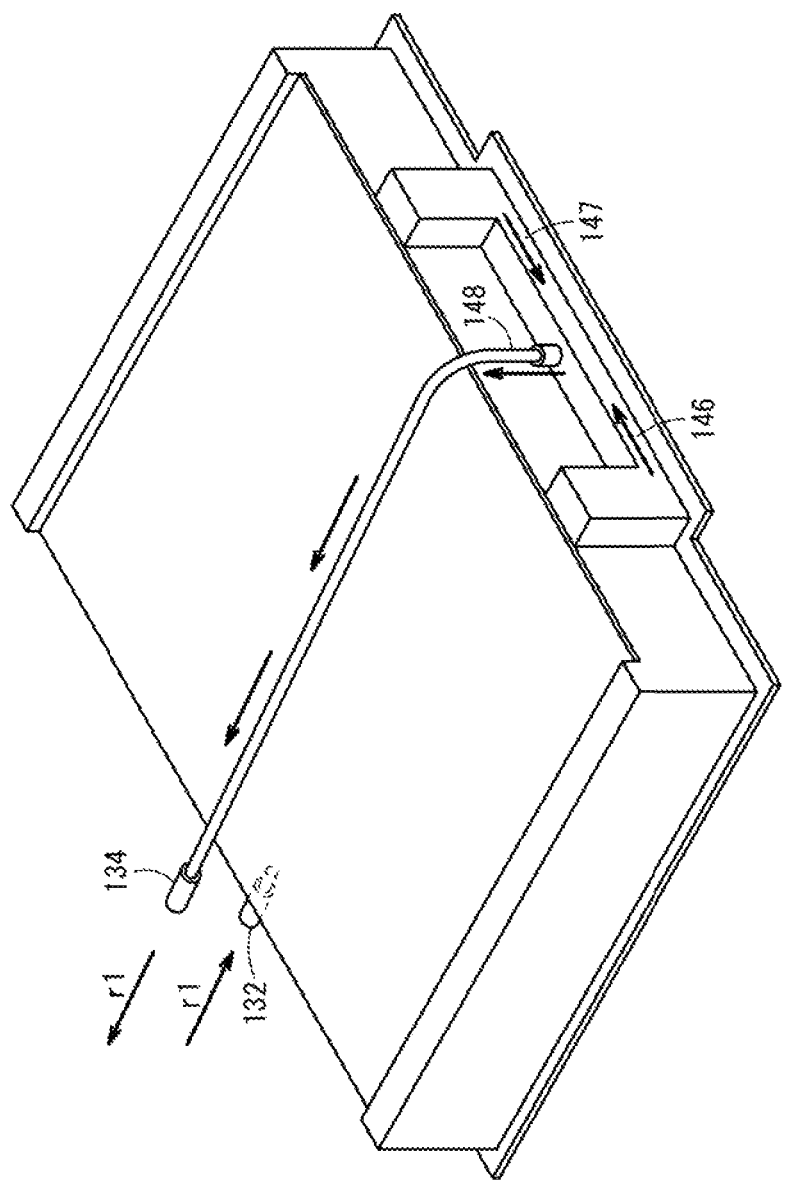
FIG. 11 is a perspective view of the battery for describing the circulating state of the first liquid refrigerant in the interior of the battery.

As shown by the bold-lined arrows in FIGS. 10 and 11, the first liquid refrigerant (referred to as a first liquid refrigerant r1) that has flowed into the interior of the battery case 130 from the input port 132 bifurcates into the left and right sides through flow paths 136, 138, and then flows into the left and right chambers 142, 143 from input ports 140, 141, and as shown in FIG. 10, the first liquid refrigerant r1 flows through space portions of the chambers 142, 143 of the battery case 130. Together therewith, in the interior of each of the battery cell units 110, the first liquid refrigerant r1 flows toward the rear surface 110R from the front surface 110F and is discharged from the rear surface 110R. The discharged first liquid refrigerant r1 is ejected from output ports 144, 145 and enters into flow paths 146, 147. Then, the first liquid refrigerant r1 merges together and enters into a flow path 148, and is discharged (flows out) to the exterior of the battery case 130 from the output port 134. In this manner, the battery cells 100 (see FIG. 6) in the interior of each of the battery cell units 110 are cooled by the first liquid refrigerant r1.

As shown in FIGS. 1 and 2, the first liquid refrigerant r1 that has flowed out to the exterior of the battery case 130 from the output port 134 flows into a heat exchanger 152 through a circulation pump 156 arranged in a flow path 166, and flows through the interior of the heat exchanger 152, and the first liquid refrigerant r1 that has flowed out from the heat exchanger 152 passes through a flow path 164 and flows into the interior of the battery case 130 from the input port 132. Thus, the first liquid refrigerant r1 is circulated through the flow path 166 and the flow path 163 between the battery case 130 and the heat exchanger 152. Stated otherwise, the first liquid refrigerant r1 is circulated through a first liquid refrigerant circulation path 161 made up from the interior (chambers 142, 143) of the battery case 130, the circulation pump 156, the flow path 166, the heat exchanger 152, and the flow path 164.

On the other hand, the heat exchanger 152 communicates with a flow path 158 in which a circulation pump 154 is provided, and with a radiator 150 and a flow path 160, the radiator 150 being disposed in the vicinity of a front grille opening on the front of the electric vehicle 10, and forms a second liquid refrigerant circulation path 162 in which a second liquid refrigerant r2 such as a coolant liquid (density≈1000 [kg/m$^3$]) or the like is made to circulate.

The second liquid refrigerant r2 flows out from the heat exchanger 152, flows into the radiator 150 through the flow path 160, passes through the interior of the radiator 150 and flows out into the flow path 158, passes through the circulation pump 154 from the flow path 158, and flows into the heat exchanger 152, that is, the second liquid refrigerant r2 flows through the interior of the second liquid refrigerant circulation path 162.

During traveling of the electric vehicle 10, although the battery 16 is charged, through the charging arm 22, with electrical power supplied from the power lines 20, during charging while the vehicle is travelling (supply of power during traveling), since the radiator 150 is disposed in the vicinity of the front grille opening where the wind pressure due to traveling air is high, if is possible for the cooling effect to be increased. As a result, during contact supply of power (contact charging) while the electric vehicle 10 is traveling, the first liquid refrigerant r1 is efficiently cooled by heat exchange with the second liquid refrigerant r2 in the heat exchanger 152, and by the first liquid refrigerant r1 thus cooled, the battery 16 is cooled, while the battery 16 can be charged. The second liquid refrigerant r2 is cooled by heat exchange being carried out with good efficiency in the interior of the radiator 150, which is cooled by the traveling air.

After the battery 16 is charged, in a state with the charging arm 22 housed in a lower part of the vehicle body, the electric vehicle 10 travels by the electric motor 14 for driving the vehicle, driven by the electrical power of the battery 16.

Summary of the Embodiment and Modifications

The electric vehicle 10 according to the present embodiment as described above is equipped with the electric motor 14 for driving the vehicle, the electric vehicle 10 comprising the battery 16 that supplies electrical power to the electric motor 14, and having battery cells 100, which are cooled by direct contact with the insulating first liquid refrigerant r1, and a battery case 130 that houses the battery cells 100 and through which the first liquid refrigerant r1 flows, a radiator 150 that dissipates heat from the second liquid refrigerant r2, and is disposed forwardly of the battery 16 in the vehicle, and a heat exchanger 132 that is disposed rearwardly of the radiator 150 in the vehicle, wherein the second liquid refrigerant r2 has a smaller specific gravity than the first liquid refrigerant r1, and the first liquid refrigerant r1 and the second liquid refrigerant r2 undergo heat exchange in the heat exchanger 152 than is disposed rearwardly of the radiator 150 in the vehicle.

According to the present embodiment, the first liquid refrigerant r1 having a relatively large specific gravity and the second liquid refrigerant r2 having a relatively small specific gravity undergo heat exchange in the heat exchanger 152, which is disposed rearwardly of the radiator 150 that is disposed on the front side of the vehicle, whereby the second liquid refrigerant r2 having a relatively small specific gravity flows from the radiator 150 to the best exchanger 152. Therefore, compared to a case in which the first liquid refrigerant r1 is made to flow from the battery case to the radiator and dissipation of heat occurs in the radiator, as in Japanese Laid-Open Patent Publication No. 2013-062023 and International Publication No. WO 2008/050736, even if there is an increase in the weight, or the heat exchanger 152, the increased weight amount of the heat exchanger 152 is exceeded by the reduced weight amount, which is made up by adding to the weight reduction amount of the liquid refrigerant that flows in the radiator 150 the weight reduction amount of the liquid refrigerant that flows through the pathway (mainly, the flow path 158 and the flow path 160) from the heat exchanger 152 to the radiator 150, and thus, an increase in the weight of the cooling mechanism for the battery 16 can be suppressed.

Consequently, while the battery cells 100 are cooled effectively by the first liquid refrigerant r1 that flows through the interior of the battery case 130, by suppressing an increase in the weight of the first liquid refrigerant r1, a reduction in the efficiency (electrical energy efficiency, fuel efficiency) of the electric vehicle can be suppressed.

Figure 12:
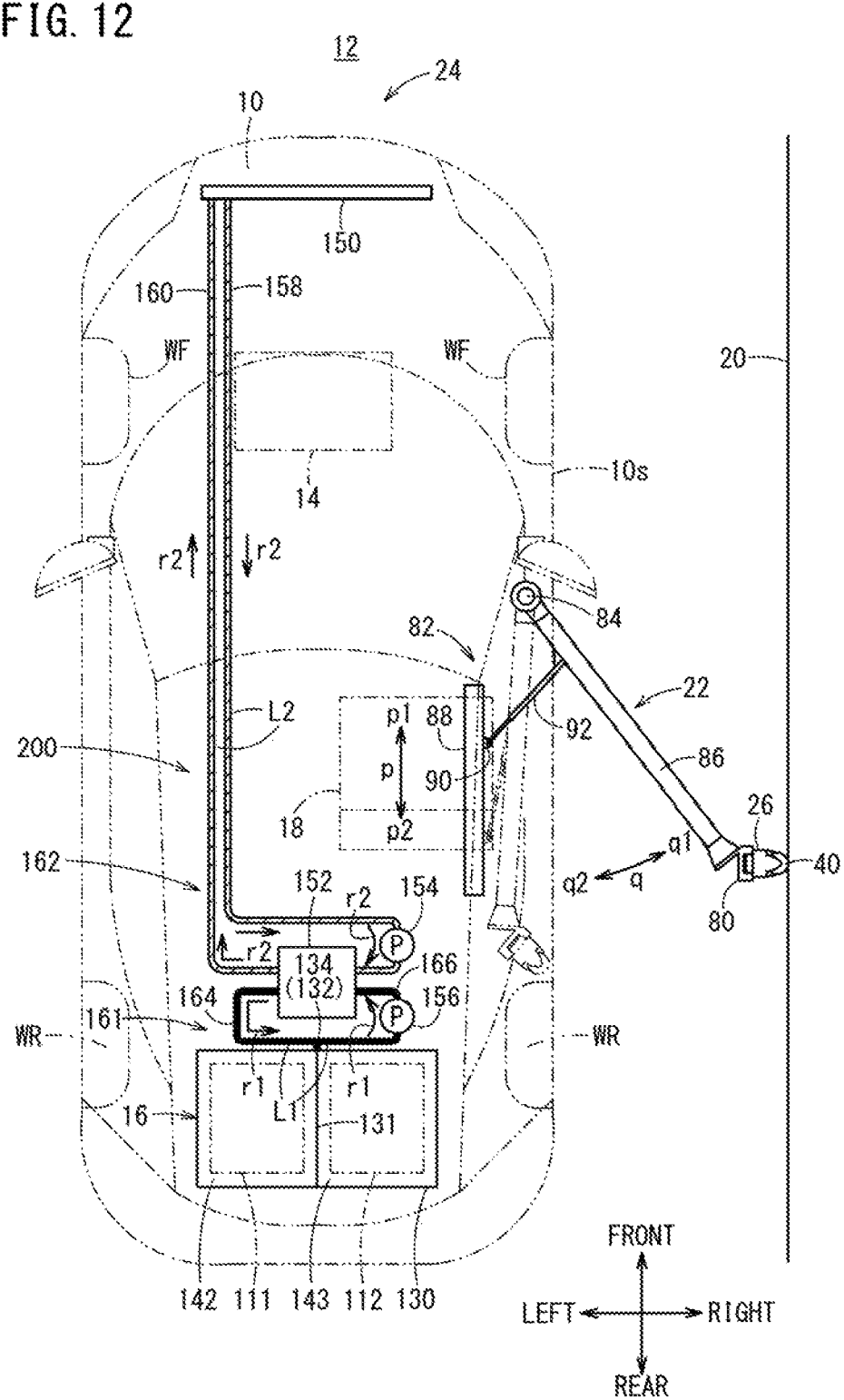
FIG. 12 is an upper surface schematic structural view emphasizing the path lengths of a first liquid refrigerant circulation path and a second liquid refrigerant circulation path of the electric vehicle according to the example of FIG. 1.
Figure 13:
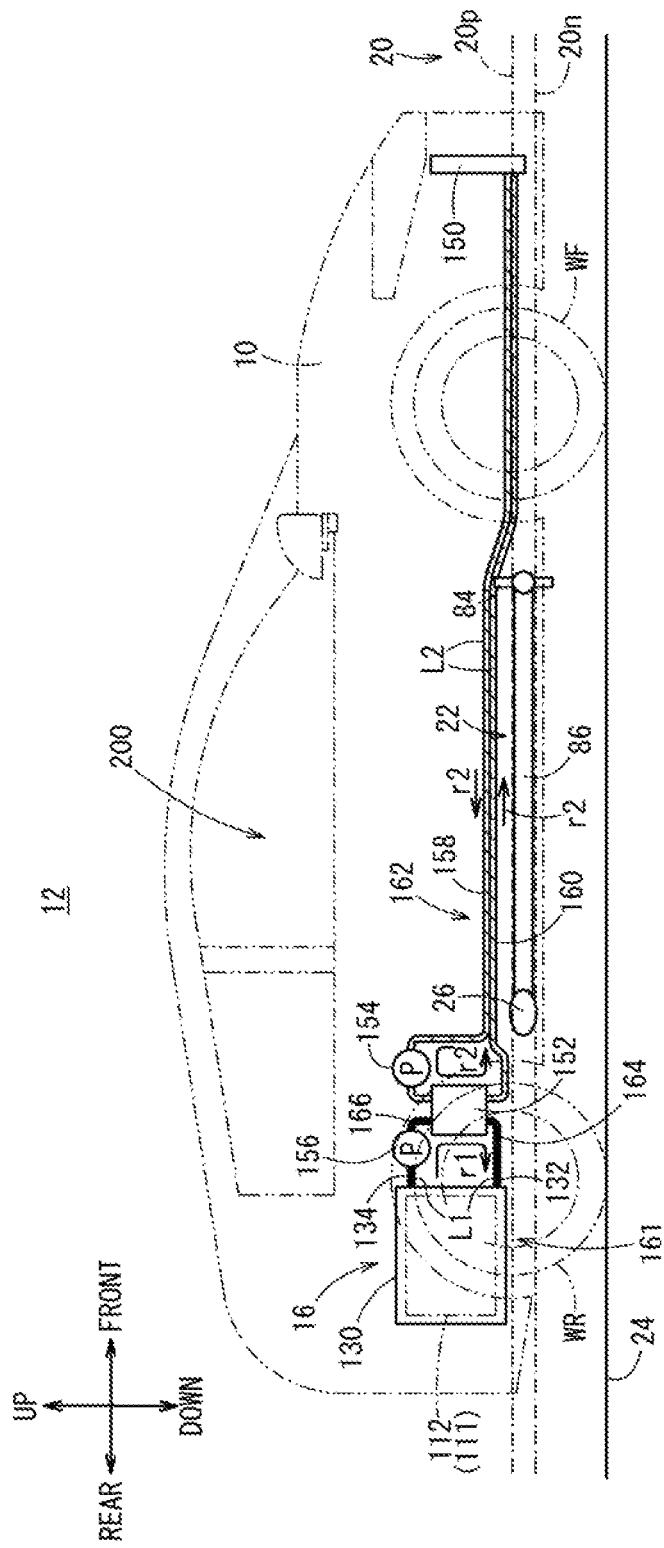
FIG. 13 is a right side surface schematic structural view emphasizing the path lengths of the first liquid refrigerant circulation path and the second liquid refrigerant circulation path of the electric vehicle according to the example of FIG. 1.

In this case, the flow path length L1 of the first liquid refrigerant circulation path 161 (as shown in FIG. 12 that corresponds to FIG. 1 and FIG. 13 that corresponds to FIG. 2, a length obtained by adding mainly the length of the flow path 166 and the length of the flow path 164, which are shown with emphasis, respectively, by the bold actual lines), along which the first liquid refrigerant r1 is circulated from the battery case 130 to the heat exchanger 152, is shorter than the flow path length L2 of the second liquid refrigerant circulation path 162 (as shown in FIGS. 12 and 13, a length obtained by adding mainly the length of the flow path 160 and the length of the flow path 158, which are shown with emphasis, respectively, by hatching), along which the second liquid refrigerant r2 is circulated from the heat exchanger 152 to the radiator 150. In this manner, since the flaw path length L1 along which the first liquid refrigerant r1 having a large specific gravity circulates can be shortened, an increase in the weight of the liquid refrigerant can be suppressed more effectively.

By the heat exchanger 152 being disposed rearwardly of the radiator 150 in the vehicle, and being arranged in front of the battery 16 or in proximity to the battery 16, the degree of freedom in the arrangement layout of the radiator 150 and the battery 16 can be increased.

As shown in FIGS. 1 and 2, by disposing the battery 16 and the heat exchanger 152 rearwardly of a vehicle compartment 200, the battery 16, which is made up from the battery case 130 in which the battery cells 100 are accommodated, can be arranged using the space behind the vehicle compartment 200, and together therewith, the heat exchanger 152 can also be disposed behind the vehicle compartment 200. Consequently, while the height inside the vehicle compartment 200 is increased, the second liquid refrigerant r2 having a relatively small specific gravity can be circulated through a relatively long pathway from the rearward side of the vehicle compartment 200 to the radiator 150 on the front side of the vehicle. In this case, while the space in the vehicle compartment 200 is ensured, an increase in the weight of the liquid refrigerant can effectively be suppressed.

Suppression of the weight increase of the cooling mechanism of the battery 16 will be illustrated roughly by the following specific example. In the case that the battery 16 is cooled only by the radiator 150 without using the heat exchanger 152, the weight of the insulating first liquid refrigerant r1 (the density of which is assumed to be 1.5 times that of the second liquid refrigerant r2, which is presumed to be 1) used for securing the insulating properties of the battery cells 100 is assumed to be 100 kg. With the cooling structure using the heat exchanger 152 of the electric vehicle 10 shown in FIGS. 1 and 2, it is possible for 50% of the insulating first liquid refrigerant r1 (density=1.5) to be replaced by the second liquid refrigerant r2 (density=1). If the weight of the heat exchanger 152 is assumed to be 5 kg, the combined weight of the liquid refrigerant and the heat exchanger 152 in the cooling structure in the example of FIGS. 1 and 2 can be represented by the following formula (1).

$$\text{Weight of First Liquid Refrigerant+Weight of Second Liquid Refrigerant+Weight of Heat Exchanger}=50 \text{ kg}+50 \text{ kg}\times 1\div 1.5+5 \text{ kg}\approx 88.3 \text{ kg} \quad (1)$$

In other words, a weight reduction of 11.7 kg (100 kg−88.3 kg) is possible.

[First Modification]

Figure 14:
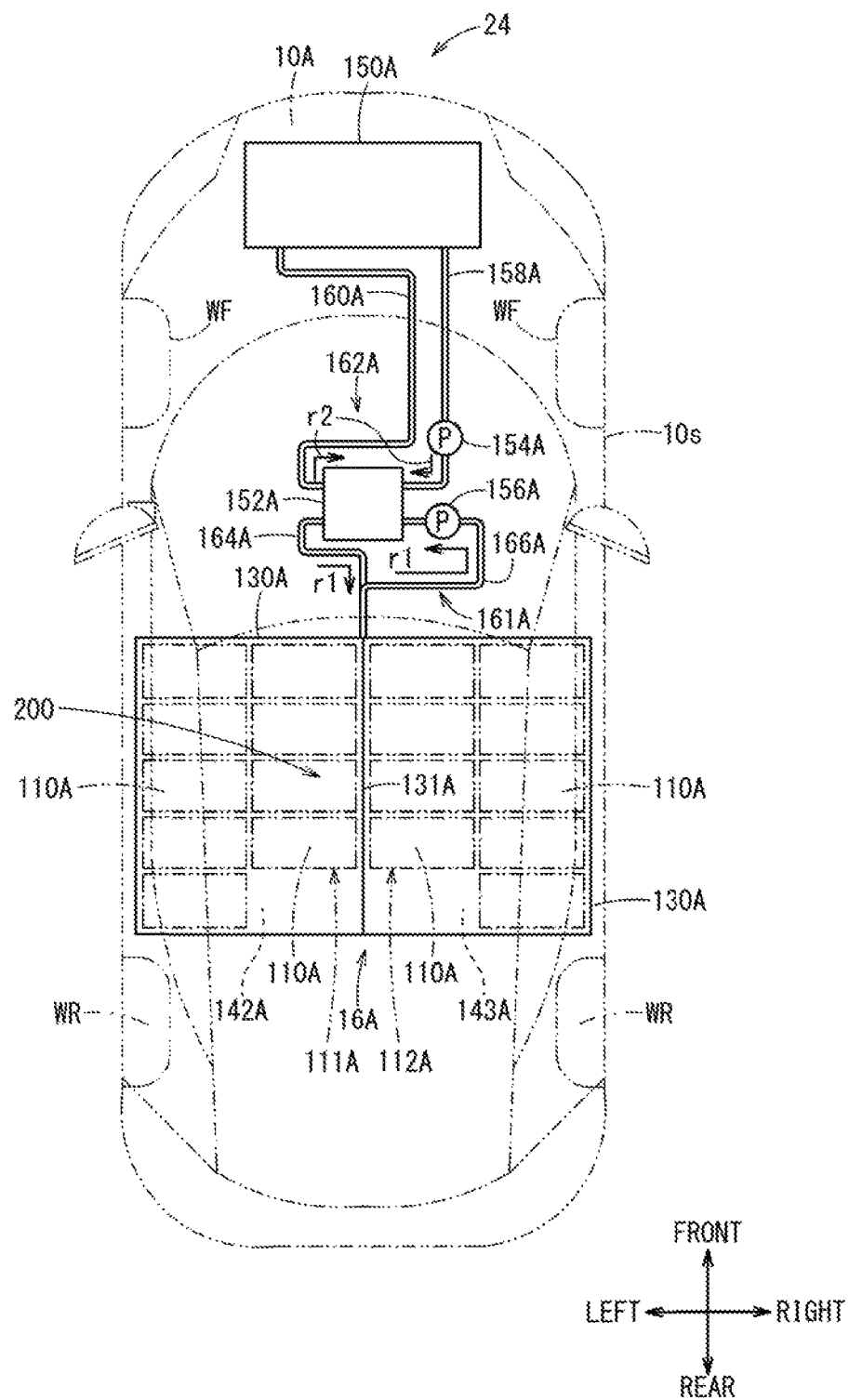
FIG. 14 is a schematic structural view of an electric vehicle according to a first modification, as seen from an upper surface thereof.
Figure 15:
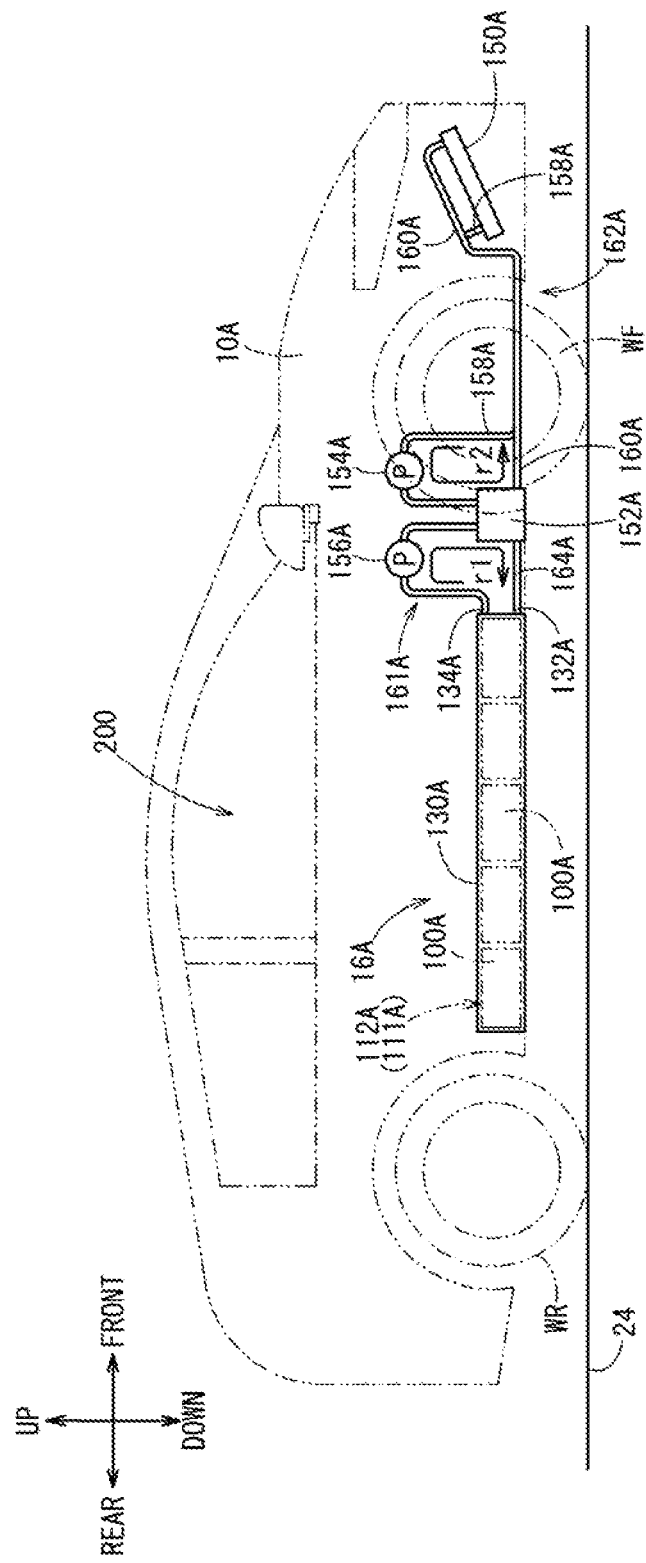
FIG. 15 is a schematic structural view as seen from a right side surface of the electric vehicle of FIG. 14.

As shown in the upper surface schematic structural view of FIG. 14 and the right side surface schematic structural view of FIG. 15, the configuration of the electric vehicle 10A may be modified such that the battery 16A is arranged downwardly of the vehicle compartment 200, and the heat exchanger 152A is disposed downwardly of the vehicle compartment 200 and in front of the battery 16A. Note that, in the electric vehicle 10A shown in FIGS. 14 and 15, the power lines 20 and the charging arm 22 that contacts the power lines 20 are omitted from illustration.

In this case, line first liquid refrigerant r1 is circulated by passing through a first liquid refrigerant circulation path 161A made up from the interior of the battery case 130A (chambers 142A and 143A, which are partitioned by the partition wall 131A), the circulation pump 156A, the flow path 166A, the heat exchanger 152A, and the flow path 164A.

On the other hand, the heat exchanger 152A communicates with a flow path 158A in which a circulation pump 154A is provided, and with a radiator 150A and a flow path 160A, the radiator 150A being disposed in the vicinity of a front grille opening on the front of the electric vehicle 10A, and thereby jointly forms a second liquid refrigerant circulation path 162A in which a second liquid refrigerant r2 such as a coolant liquid (density≈1000 [kg/m³]) or the like is made to circulate.

The second liquid refrigerant r2 flows out from the heat exchanger 152A, flows into the radiator 150A by passing through the flow path 160A, passes through the interior of the radiator 150A and flows out into the flow path 158A, passes through the circulation pump 154A from the flow path 158A, and flows into the heat exchanger 152A. In this manner, the second liquid refrigerant r2 flows through the interior of the second liquid refrigerant circulation path 162A.

By being arranged in the foregoing manner, the battery 16A, which is made up from the battery cells 100A and the battery case 130A in which the battery cells 100A are accommodated, can be arranged using the space below the vehicle compartment 200, and together therewith, the heat exchanger 152A can also be disposed in a position where it is unlikely to have an influence on the space in the vehicle compartment 200. Consequently, while the space in the vehicle compartment 200 is ensured, by suppressing an increase in the weight of the liquid refrigerant, a reduction in the efficiency (electrical energy efficiency, fuel efficiency) of the electric vehicle 10A can be suppressed.

Figure 16:
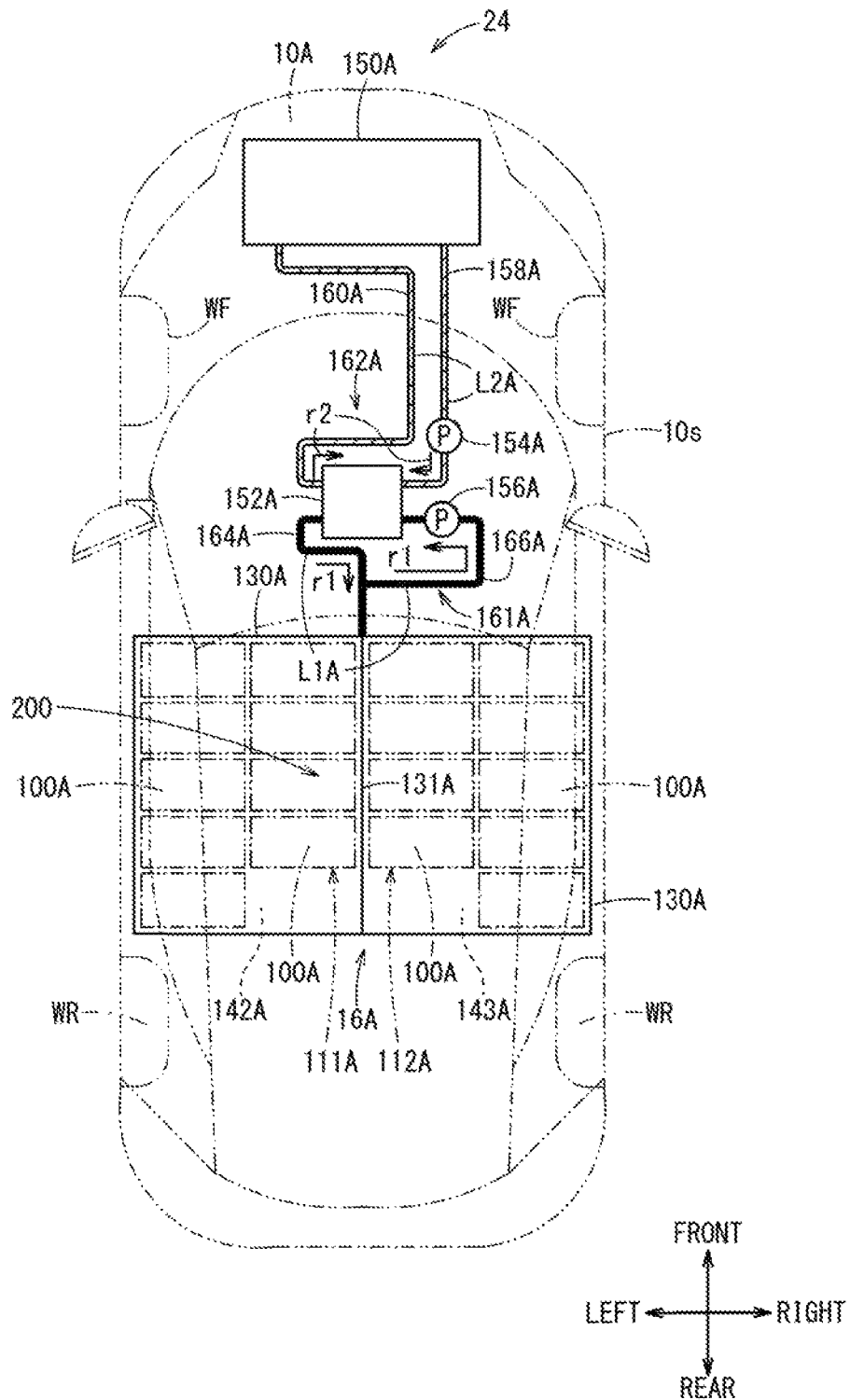
FIG. 16 is an upper surface schematic structural view emphasizing the path lengths of a first liquid refrigerant circulation path and a second liquid refrigerant circulation path of the electric vehicle according to the first modification.
Figure 17:
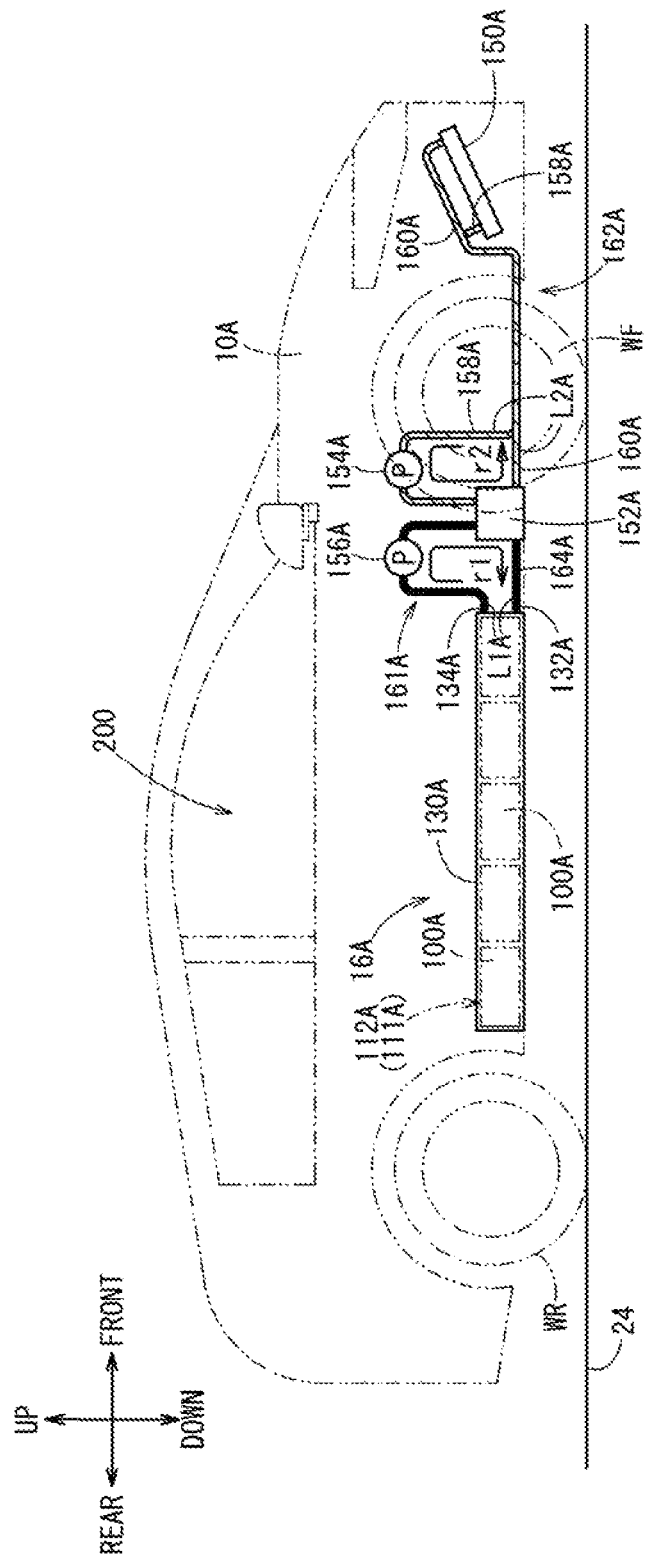
FIG. 17 is a right side surface schematic structural view emphasizing the path lengths of the first liquid refrigerant circulation path and the second liquid refrigerant circulation path of the electric vehicle according to the first modification.

In the first modification as well, the flow path length L1A of the first liquid refrigerant circulation path 161A (as shown in FIG. 16 that corresponds to FIG. 14 and FIG. 17 that corresponds to FIG. 15, a length obtained by adding mainly the length of the flow path 166A and the length of the flow path 164A, which are shown with emphasis, respectively, by the bold actual lines), along which the first liquid refrigerant r1 is circulated from the battery case 130A to the heat exchanger 152A, is shorter than the flow path length L2A of the second liquid refrigerant circulation path 162A (as shown in FIGS. 16 and 17, a length obtained by adding the length of the flow path 160A and the length of the flow path 158A, which are shown generally by hatching), along which the second liquid refrigerant r2 is circulated from the heat exchanger 152A to the radiator 150A. Therefore, the path length L1A along which the first liquid refrigerant r1 having a large specific gravity circulates can be shortened, and an increase in the weight of the liquid refrigerant can be suppressed more effectively.

According to the above-described embodiment and the aforementioned first modification, the first liquid refrigerant r1 having a relatively large specific gravity and the second liquid refrigerant r2 having a relatively small specific gravity undergo heat exchange in the heat exchanger 152, 152A, which is disposed rearwardly of the radiator 150, 150A that is disposed on the front side of the vehicle, whereby the second liquid refrigerant r2 having a relatively small specific gravity flows from the radiator 150, 150A to the heat exchanger 152, 152A. Therefore, compared to a case in which the first liquid refrigerant r1 is made to flow from the battery case 130, 130A to the radiator 150, 150A and dissipation of heat occurs in the radiator 150, 150A, as in Japanese Laid-Open Patent Publication No. 2013-062023 and international Publication No. WO 2008/050736, even if there is an increase in the weight of the heat exchanger 152, 152A, the increased weight amount of the heat exchanger 152, 152A portion is exceeded by the reduction in weight of the liquid refrigerant that flows in the radiator 150, 150A and the reduction in weight of the liquid refrigerant that flows through the pathway from the heat exchanger 152, 152A to the radiator 150, 150A, and thus, an increase in the weight of the cooling mechanism for the battery 16, 16A can be suppressed.

Consequently, while the battery cells 100, 100A are cooled effectively by the first liquid refrigerant r1 that flows through the interior of the battery case 130, 130A, by suppressing an increase in the weight of the first liquid refrigerant r1 having a relatively large specific gravity, a reduction in the efficiency (electrical energy efficiency, fuel efficiency) of the electric vehicle 10, 10A can be suppressed, together with enabling an improvement in cooling efficiency.

The present invention is not limited to the above-described embodiments. It is a matter of course that the present invention can be applied to an ordinary electric vehicle not equipped with a contact type electrical power supplying system (the charging arm 22 is not mounted thereon), and various other configurations could be adopted therein based on the content disclosed in the present specification.

The invention claimed is:

1. An electric vehicle equipped with an electric motor configured to drive the vehicle, comprising:
   a battery configured to supply electrical power to the electric motor, and having a battery cell, the battery cell being cooled by direct contact with an insulating first liquid refrigerant, the battery including a battery case configured to house therein the battery cell and through which the first liquid refrigerant flows;
   a radiator configured to dissipate heat from a second liquid refrigerant, the radiator being disposed forwardly of the battery in the electric vehicle; and
   a heat exchanger that is disposed rearwardly of the radiator in the electric vehicle;
   wherein the second liquid refrigerant has a smaller specific gravity than the first liquid refrigerant; and
   the first liquid refrigerant and the second liquid refrigerant undergo heat exchange in the heat exchanger that is disposed rearwardly of the radiator in the electric vehicle such that the first liquid refrigerant is cooled by the heat exchange with the second liquid refrigerant in the heat exchanger.

2. The electric vehicle according to claim 1, wherein a path length of a first liquid refrigerant circulation path along which the first liquid refrigerant is circulated from the battery case to the heat exchanger is shorter than a path length of a second liquid refrigerant circulation path along which the second liquid refrigerant is circulated from the heat exchanger to the radiator.

3. The electric vehicle according to claim 1, wherein the heat exchanger is disposed rearwardly of the radiator in the electric vehicle, and is arranged in front of the battery or in proximity to the battery.

4. The electric vehicle according to claim 1, wherein:
   the battery is disposed downwardly of a vehicle compartment; and
   the heat exchanger is disposed downwardly of the vehicle compartment and in front of the battery.

5. The electric vehicle according to claim 1, wherein the battery and the heat exchanger are disposed rearwardly of a vehicle compartment.

6. The electric vehicle according to claim 1, further comprising a first liquid refrigerant circulation path connecting the battery case to the heat exchanger and a second liquid refrigerant circulation path connecting the heat exchanger to the radiator such that the first liquid refrigerant is circulated inside the first liquid refrigerant circulation path and the second liquid refrigerant is circulated inside the second liquid refrigerant circulation path.

* * * * *